(12) United States Patent
Gharibi Loron

(10) Patent No.: US 10,229,611 B2
(45) Date of Patent: Mar. 12, 2019

(54) DEVICE FOR IMPROVING MENTAL CONCENTRATION

(71) Applicant: Ali Gharibi Loron, Ardabil (IR)

(72) Inventor: Ali Gharibi Loron, Ardabil (IR)

( * ) Notice: Subject to any disclaimer, the term of this patent is extended or adjusted under 35 U.S.C. 154(b) by 225 days.

(21) Appl. No.: 15/048,973

(22) Filed: Feb. 19, 2016

(65) Prior Publication Data
US 2017/0243509 A1 Aug. 24, 2017

(51) Int. Cl.
G09B 19/00 (2006.01)
G09B 5/00 (2006.01)

(52) U.S. Cl.
CPC ............. *G09B 19/00* (2013.01); *G09B 5/00* (2013.01)

(58) Field of Classification Search
CPC ............ G02C 7/16; A63B 23/00; A63B 23/03
See application file for complete search history.

(56) References Cited

U.S. PATENT DOCUMENTS

| 1,096,761 | A | * | 5/1914 | Scheer | A62B 17/04 128/201.23 |
| 1,193,340 | A | * | 8/1916 | Bader | A61F 9/025 2/449 |
| 1,340,701 | A | * | 5/1920 | Day | A61F 9/02 2/449 |
| 1,706,682 | A | * | 3/1929 | Takacs | G02C 11/12 2/13 |
| 2,253,101 | A | * | 8/1941 | Thoreson | G02C 7/16 2/13 |
| 2,281,129 | A | * | 4/1942 | Wolff | G02C 7/12 2/13 |
| 2,556,433 | A | * | 6/1951 | Mitchell | G02C 7/16 2/432 |
| 2,858,539 | A | * | 11/1958 | Carlson | G02C 7/16 2/13 |
| 3,204,252 | A | * | 9/1965 | Herrington, Sr. | G02C 7/16 2/13 |
| 3,308,478 | A | * | 3/1967 | Tate | A61F 9/045 2/12 |
| 3,359,855 | A | * | 12/1967 | Webb | G03B 21/001 353/12 |
| 3,505,679 | A | * | 4/1970 | Bennett | G02C 7/16 2/13 |

(Continued)

OTHER PUBLICATIONS

Ali Gharibi Loron, English Translation of IR Patent 81613 (Jan. 2014).

*Primary Examiner* — Jason Skaarup
(74) *Attorney, Agent, or Firm* — NovoTechIP International PLLC

(57) ABSTRACT

A device including a nose pad configured to be placed on a nose of a user; and a first visual shield coupled to the nose pad and including a first plurality of hydraulic tubes radially spaced apart from each other and a light-blocking material therebetween, wherein the hydraulic tubes are configured to radially extend in response to hydraulic pressure to selectively restrict the user's peripheral visual field and consequently by elimination of the peripheral vision that distract the user result in increasing the user's concentration; and a hydraulic pump connected to the plurality of hydraulic tubes, the hydraulic pump being coupled to the nose pad and configured to provide hydraulic pressure for radially extending the first plurality of hydraulic tubes.

11 Claims, 9 Drawing Sheets

(56) References Cited

U.S. PATENT DOCUMENTS

| | | | | | |
|---|---|---|---|---|---|
| 3,606,890 | A | * | 9/1971 | Gilbert | A61F 7/02 607/104 |
| 4,298,991 | A | * | 11/1981 | Recenello | G02C 9/02 2/13 |
| 4,666,148 | A | * | 5/1987 | Crawford | A63B 23/03 482/11 |
| 4,751,746 | A | * | 6/1988 | Rustin | A61F 9/029 2/13 |
| 5,608,469 | A | * | 3/1997 | Boll e | A61F 9/029 2/449 |
| 5,718,002 | A | * | 2/1998 | Pavlak | A61F 9/029 2/13 |
| 5,793,463 | A | * | 8/1998 | Hirschman | G02C 7/16 351/44 |
| 6,275,998 | B1 | * | 8/2001 | Tromble | A61F 9/04 2/15 |
| 6,280,031 | B1 | * | 8/2001 | Zerkle | G02B 5/04 351/155 |
| 7,296,887 | B1 | * | 11/2007 | Hsiung | G02C 7/16 2/449 |
| 8,042,936 | B2 | * | 10/2011 | Hobbs | G02C 7/16 2/449 |
| 9,046,701 | B2 | * | 6/2015 | Nodtvedt | G02C 11/12 |
| 9,201,251 | B2 | * | 12/2015 | Sadler | G02C 11/12 |

* cited by examiner

DEVICE FOR IMPROVING MENTAL CONCENTRATION

BACKGROUND

The human mind receives constant visual and auditory information from the environment. These signals can result in distraction of an individual who is attempting to concentrate on a task such as studying. For example, movement within the individual's visual field or sounds generated by nearby activities can disrupt the individual's thought process.

Also, when a person has been concentrating on a task for an extended period of time, their mind tends to lose focus on the intended material and perhaps daydream. For example, this often happens to students with a lot of material to study every day. As a result, over the course of the day, the person will have low input periods of study and unintentionally miss some material during study. Furthermore, the brain is not always prepared to perform a task requiring concentration, such as when a person is experiencing anxiety, depression, and/or tiredness.

Although there is a demonstrated improvement in a child's grades with parental supervision of studying, parents with today's busy lifestyles generally do not have enough time to be with their children in order to supervise their child's studying process and period.

Although there are some study aids such as study tables, study planning equipment and applications, and headphones to facilitate studying, there still remains significant room for improvement and a desire for new tools to help people learn and maintain effective study habits, conserve time, and increase efficiency.

SUMMARY

The foregoing and other objects, features, aspects and advantages of the present invention will become more apparent from the following detailed description of the present application when taken in conjunction with the accompanying drawing.

In one general aspect, a device including a nose pad configured to be placed on a nose of a user; and a first visual shield coupled to the nose pad and including a first plurality of hydraulic tubes radially spaced apart from each other and a light-blocking material therebetween, wherein the hydraulic tubes are configured to radially extend in response to hydraulic pressure to selectively restrict a first portion of the user's peripheral visual field; and a hydraulic pump connected to the plurality of hydraulic tubes, the hydraulic pump being coupled to the nose pad and configured to provide hydraulic pressure for radially extending the first plurality of hydraulic tubes.

The device may further include a second visual shield coupled to the nose pad and including a second plurality of hydraulic tubes radially spaced apart from each other and a light-blocking material therebetween, wherein the hydraulic tubes are configured to radially extend in response to hydraulic pressure to selectively restrict a second portion of the user's peripheral visual field; wherein the hydraulic pump is further configured to provide hydraulic pressure for radially extending the second plurality of hydraulic tubes.

The device may further include two temples configured to be placed on the user's ears; wherein the first visual shield further includes a first transparent lens corresponding to a first central visual field of a first eye of the user; and wherein the second visual shield further includes a second transparent lens corresponding to a second central visual field of a second eye of the user.

The first plurality of hydraulic tubes may be radially spaced apart from each other by approximately a 15 degree distance.

The first plurality of hydraulic tubes and the light-blocking elastic material may be arranged to restrict a visual area outside of the first central visual field.

The first central visual field may cover approximately 30 degrees from a pupil of the first eye, and the second central visual field covers approximately 30 degrees from a pupil of the second eye.

The first plurality of hydraulic tubes may be configured to roll and unroll with approximately 20 degree amplitude from standard peripheral filed edge to regulate restriction of peripheral visual field by user.

The hydraulic pump may include a cylinder and a screw, wherein as the screw is tightened within the cylinder hydraulic pressure is built within the plurality of connectors to force the first plurality of hydraulic tubes to expand.

The device may further include a brain sensor configured to sense a concentration level of the user.

The device may further include a proximity sensor configured to determine proximity of the device to the user's head.

The device may further include a processor configured to receive, from the proximity sensor, proximity information; determine based on the received proximity information whether the device is being used; upon determining the device is being used, activate a timer to measure an amount of time the device is being used; receive, from the brain sensor and during the amount of time the device is being used, information about the concentration level of the user; compare the concentration level of the user against a threshold concentration level; and in response to determining the concentration level of the user is below the threshold concentration level, send an instruction to a camera to take a photograph of an area the user is viewing.

The processor may be further configured to determine the device is not being used subsequent to activation of the timer; in response to determining the device is not being used, deactivate the tinier; analyze the received information about the concentration level of the user during the time the device is being used; and send the analyzed information to an external device.

The processor may be further configured to generate a graph of the analyzed information for display on the external device to show times the concentration level is above a first threshold and times the concentration level is below a second threshold.

The processor may be further configured to send the analyzed information to the external device located remotely from the device via a wired or a wireless network.

In another general aspect, a device including a supporting frame configured to be placed around a head of a user; a visual shield movably coupled to the supporting arm and configured to move between a first position and a second position to regulate the visual field of the person, wherein in the second position the visual shield is configured to restrict a visual field of the user and focus an attention of the user on a specific area and in the first position is configured to substantially not restrict the visual field of the user; a brain sensor coupled to the supporting frame and configured to sense a concentration level of the user; and a processor configured to: activate a timer to measure an amount of time the device is being used when the visual shield is in the second position; receive, from the brain sensor and during the time the device is being used, information about the concentration level of the user; compare the concentration level of the user against a first threshold concentration level; and in response to determining the concentration level of the user is below the threshold concentration level, send an instruction to a camera to take a photograph of an area the user is viewing.

The processor may be further configured to determine the device is not being used subsequent to activation of the timer when the visual shield is moved to the first position from the second position; in response to determining the device is not being used, deactivate the timer; analyze the received information about the concentration level of the user during the time the device is being used; and send the analyzed information to an external device.

The processor may be further configured to generate a graph of the analyzed information for display on the external device to show times the concentration level is above a second threshold concentration level and times the concentration level is below the first threshold concentration level.

The processor may be further configured to send the analyzed information to the external device located remotely from the device via a wired or a wireless network.

BRIEF DESCRIPTION OF THE DRAWINGS

The drawing figures depict one or more implementations in accord with the present teachings, by way of example only, not by way of limitation.

FIG. 5 illustrates a top view;

FIG. 6 illustrates a perspective view;

FIG. 7 illustrates a front views; and

FIG. 8 illustrates a side view.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

This application describes examples of devices for improving mental concentration and automatically identifying periods of low concentration. Such devices are useful for, for example, studying and developing effective study habits. Some examples can also provide useful data to a user and/or a supervisor. Such devices are useful in public libraries, university libraries, dormitories, shared rooms, and study at home without a parent's presence for coaching purposes.

Although there are some study aids such as study tables, study planning equipment and applications, and headphones, none of them are as useful and effective as the examples described herein. Also, although some mind wave readers have been introduced for meditation and focusing games and applications, they have not been applied to increase study performance, measure concentration quality, fill concentration gaps, and inform users when the brain does not appear to be ready to concentrate.

Figure 1:
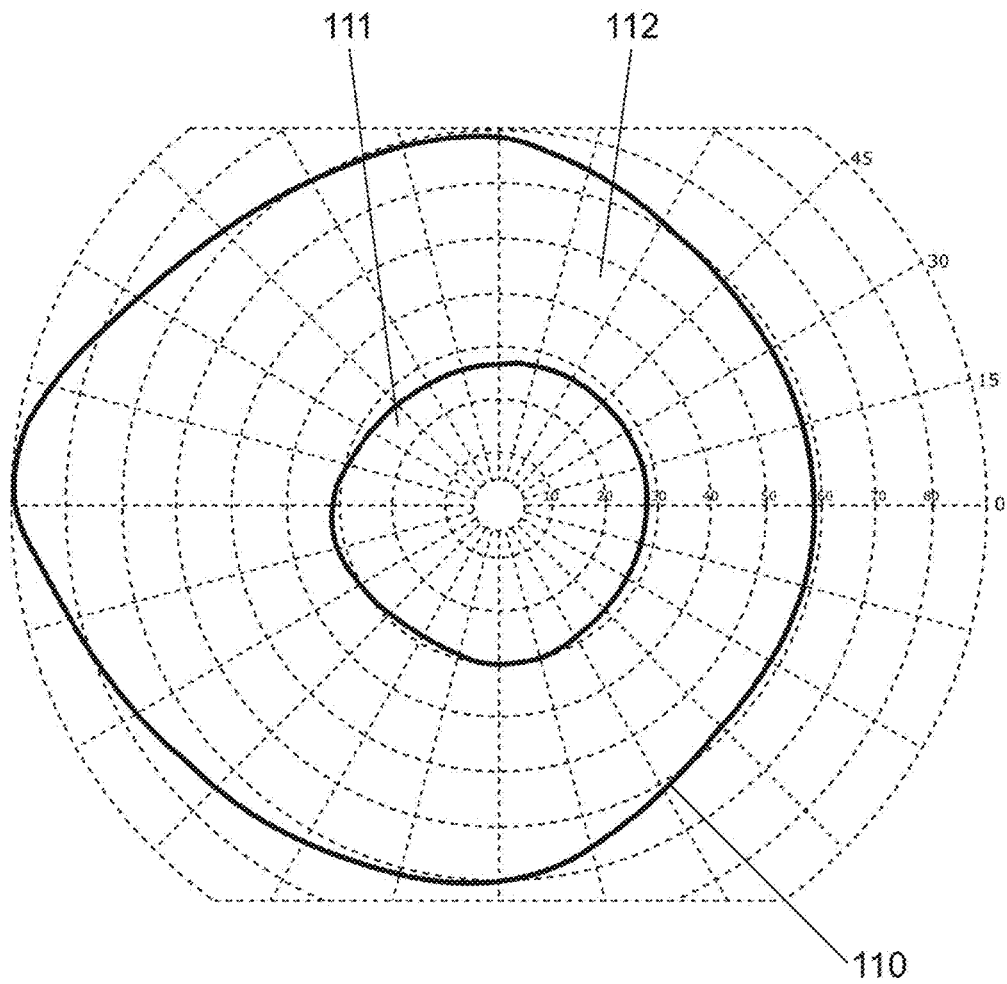
FIG. 1 illustrates a projection of typical ranges of the visual field of a human eye.

FIG. 1 illustrates a projection of typical ranges of the visual field of a human eye. The macular visual field 110 includes the central visual field 111 and the peripheral visual field 112, with maximum visual power being in the central visual field 111. In general, the central visual field 111 extends approximately 30 degrees superiorly, inferiorly, temporally, and nasally from a central point of visual fixation, as illustrated in FIG. 1. In general, the peripheral visual field 112 extends approximately 100 degrees temporally, 60 degrees nasally, 60 degrees superiorly, and 75 degrees inferiorly, as illustrated in FIG. 1.

Figure 2:
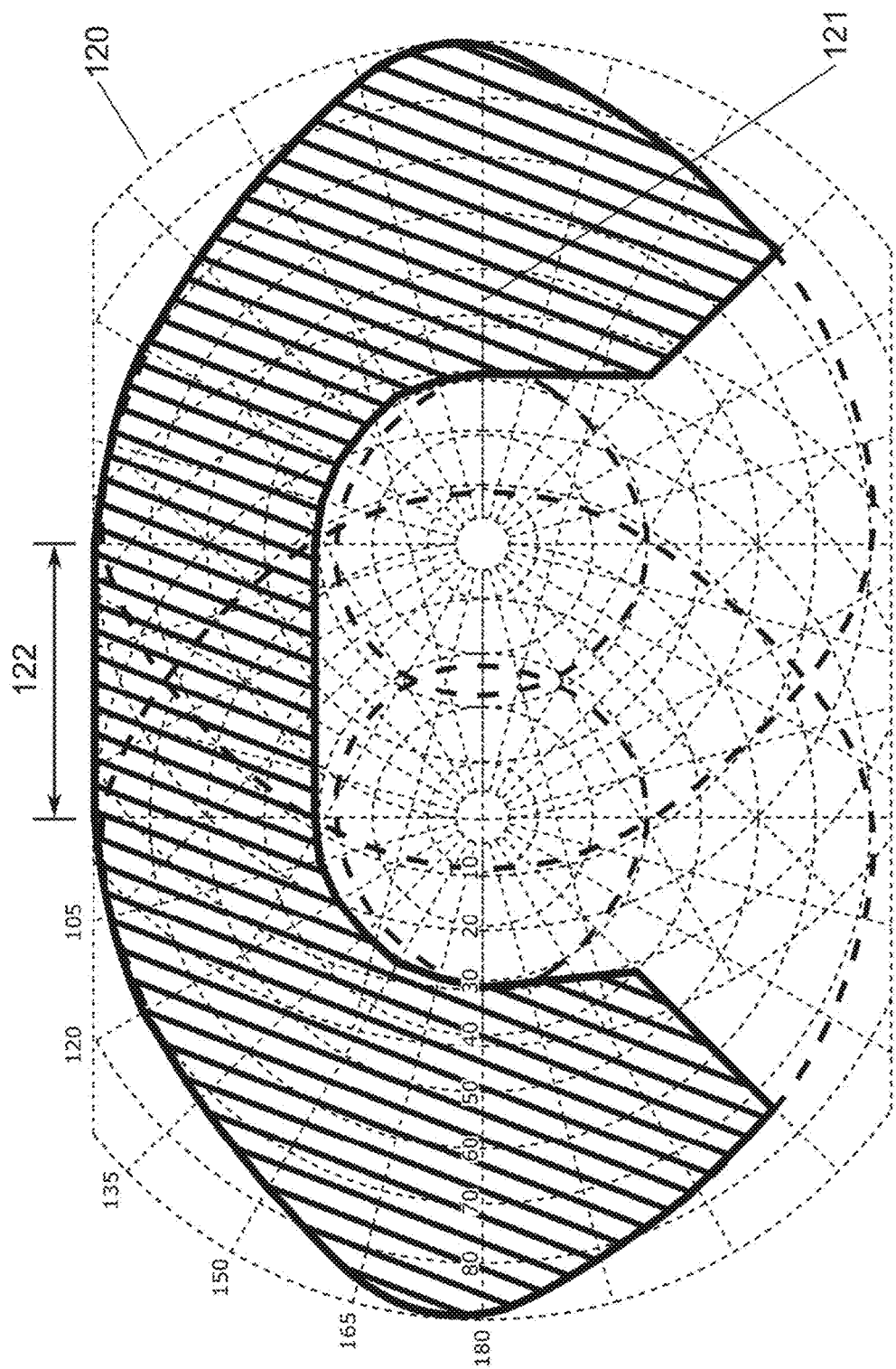
FIG. 2 illustrates a projection 120 of a visual shielding area 121.

FIG. 2 illustrates a projection 120 of a visual shielding area 121. Mirror images of the projection of FIG. 1 are illustrated, with their respective central points of visual fixation separated by a distance 122, which on average is approximately 63 mm. Visual shielding area 121, which is illustrated by shaded region in FIG. 2, is determined based on the overlapping peripheral visual fields with the central visual fields excluded. In order to maintain ergonomic properties and convenience of the resulting device, the inferior part of the visual field is also excluded from visual shielding area 121. Since little or no distracting visual stimulation occurs in the inferior part, its exclusion is not expected to result in interruption of concentration FIGS. 5-8 illustrate various views of an example of a visual shield 300 created based on the projection 120 of FIG. 2. In the example illustrated in FIGS. 5-7, the three-dimensional shape of visual shield 300 is generated based on a projection or projections of projection 120 onto a sphere or pair of spheres. The diameter of the sphere or spheres is selected based on comfortably fitting visual shield 300 over and in front of a human head. Visual shield 300 comprises a light-blocking material to obstruct the view of movement and objects in a user's peripheral visual field. Visual shield 300 conserves an optimum desired visual field and at the same time to eliminates unnecessary visual stimulus from peripheral visual field 112.

Figure 3:
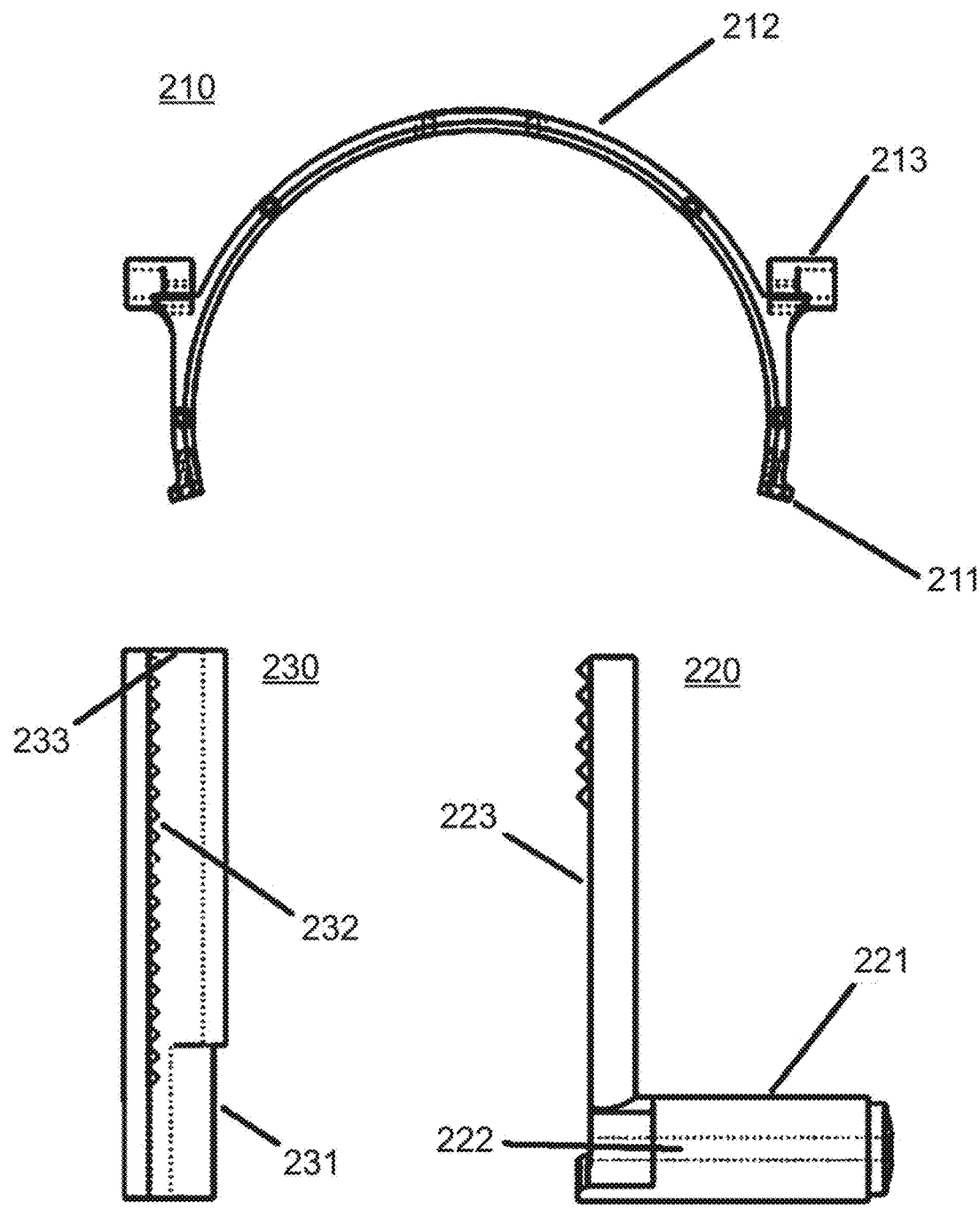
FIG. 3 illustrates an example of a supporting frame 210, a supporting elbow 220, and a supporting arm 230 used to support visual shield 300.

FIG. 3 illustrates an example of a supporting frame 210, a supporting elbow 220, and a supporting arm 230 used to support and regulate visual shield 300. Frame 210 may be connected to a headphone, headband, hat, or other apparatus via a pair of brackets 211 for placing supporting frame 210 and visual shield 300 on a human head. Extending between brackets 211 is arch 212, which when worn extends approximately across the user's forehead, and which includes the pair of cylindrical receptacles 213. In some examples, arch 212 may also support a brain sensor (not illustrated in FIG. 3) which performs sensing via the user's forehead. Cylindrical receptacle 213 receives cylinder 221 of supporting elbow 220. The cylindrical shape allows supporting elbow 220 to be rotated upward and downward within cylindrical receptacle 213, which allows for adjusting the position upward and downward of visual shield 300 attached thereto. Supporting elbow 220 also includes a spring 222, the force of which increases friction that maintains stability of the resulting device. Toothed shaft 223 is placed within end 231 of supporting arm 230 and engages with teeth 232 therein. The teeth 232 allow for adjustment the position forward and backward of visual shield 300 attached thereto. Much as illustrated in FIGS. 5-8, visual shield 300 attaches to supporting arm 230 via receptacle 233 at the end of supporting arm opposite from end 231.

Figure 4:
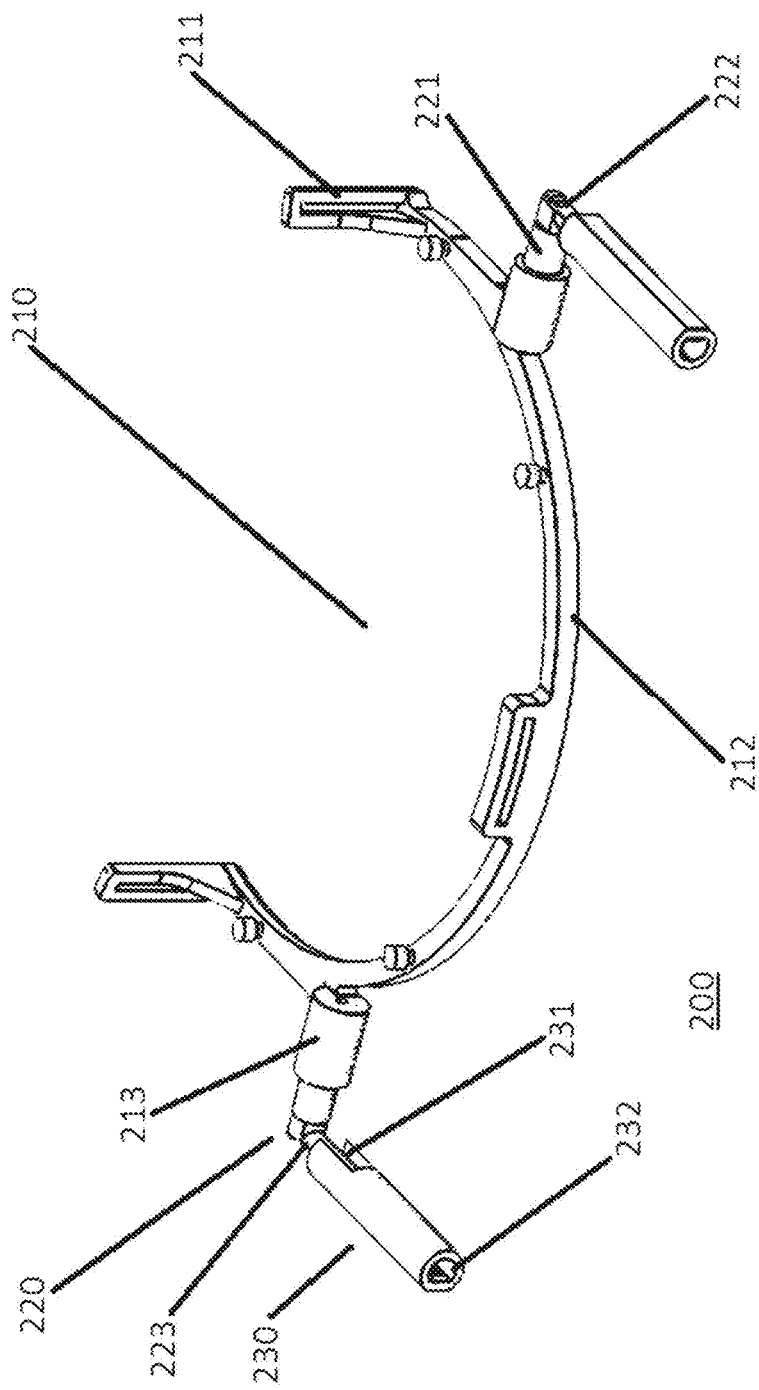
FIG. 4 illustrates an example of a support 200 including supporting frame 210 with supporting elbows 220 and supporting arms attached thereto.

FIG. 4 illustrates an example of a support 200 including supporting frame 210 with supporting elbows 220 and supporting arms attached thereto.

Figure 6:
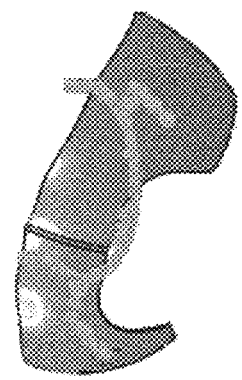
FIGS. 5-8 illustrate various views of an example of a visual shield 300 created based on the projection 120 of FIG. 2 and attached to support 200 of FIG. 4.
Figure 8:
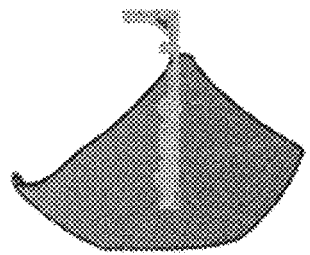
Figure 5:
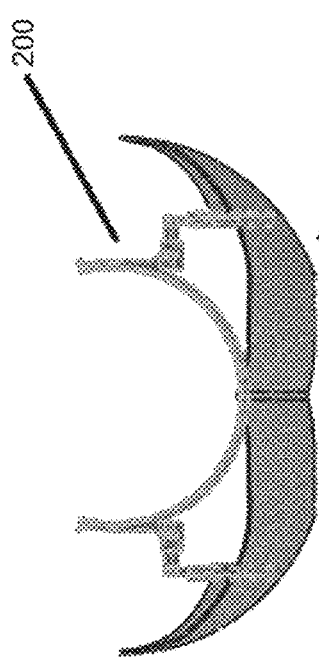
Figure 7:
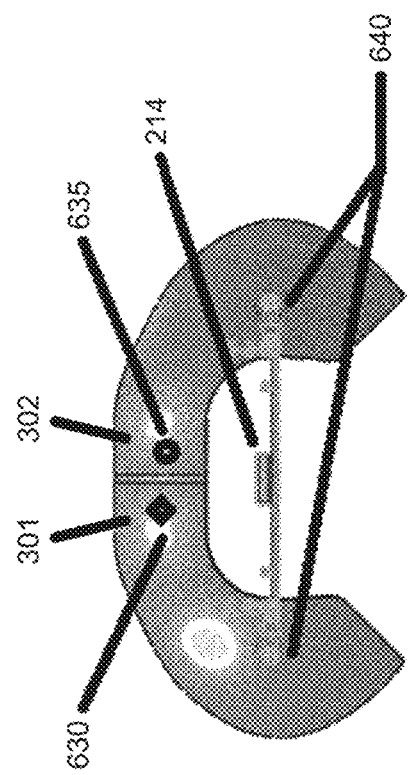

FIGS. 5-8 illustrate various views of an example of a visual shield 300 created based on the projection 120 of FIG. 2 and attached to support 200 of FIG. 4. FIG. 5 illustrates a top view; FIG. 6 illustrates a perspective view FIG. 7 illustrates a front view; and FIG. 8 illustrates a side view. In FIGS. 5-8, visual shield 300 is illustrated in a raised position that substantially does not restrict the user's visual field; visual shield 300 would be rotated downward during use for studying. In some examples, a sensor may be included to detect when visual shield 300 is in the downward position. In some examples, visual shield 300 includes light sensor 630, camera 635, and light source 640. In some examples, visual shield 300 may include both a light-blocking rigid shield material arranged to block an inner portion of a user's peripheral visual field, and the light-blocking elastic shield material arranged to block an outer portion of the user's peripheral visual field. In some examples, the plurality of hydraulic tubes and elastic material in-between are configured to roll and unroll with 20 degree amplitude from standard peripheral filed edge to regulate restriction of peripheral visual field by user.

Figure 9:
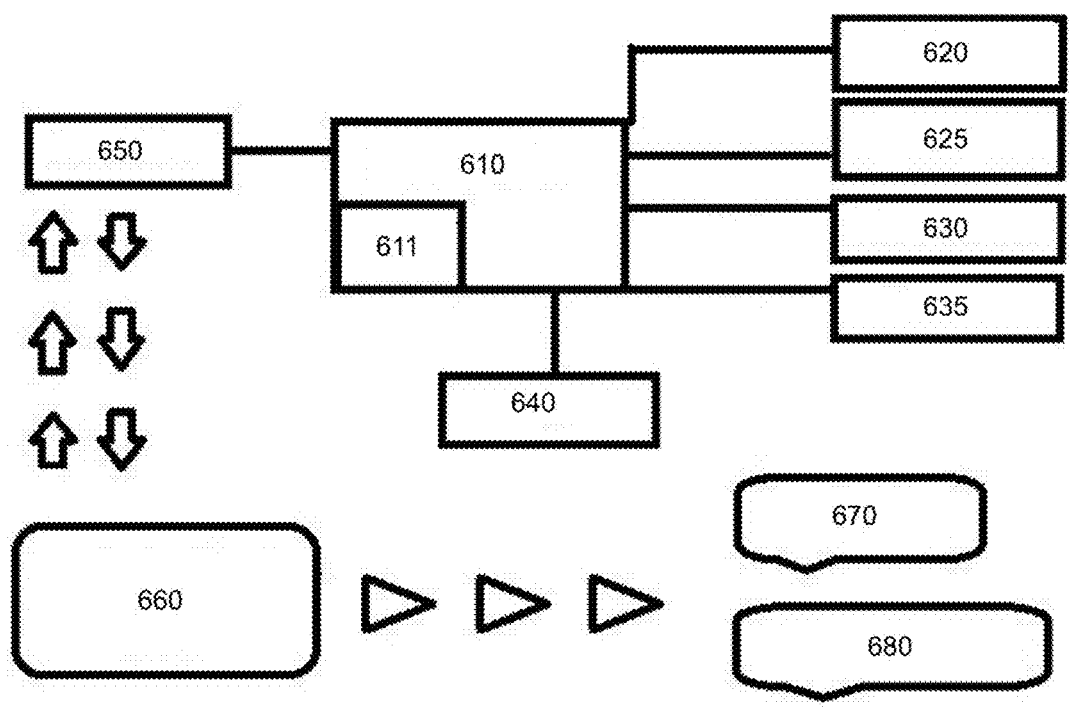
FIG. 9 illustrates an example including a processing unit 610 and various sensors and accessories.

FIG. 9 illustrates an example including a processing unit 610 and various sensors and accessories. Processing unit 610 includes a microprocessor, memory, and program code. The program code may be stored in a nontransitory computer readable storage medium, such as, but not limited to, a flash memory module. Processing unit 610 received power via power center 611, which may include, for example, a battery and/or a power connector for providing power to processing unit 610 and the various sensors and accessories connected thereto illustrated in FIG. 9. Processing unit 610 is attached to and programmed to receive and process information obtained by brain sensor 620, proximity sensor 625, and brightness sensor 630 attached to support 200.

Processing unit 610 is also attached to and programmed to control light source 640. Light output by light source 640 is directed forward to illuminate objects or materials that a user may be concentrating on. In general, a broad-spectrum light source is preferred. In some examples, light source 640 includes multiple light sources to more evenly distribute light. In some examples, processing unit 610 may be capable of adjusting the amount of light output by light source 640, and in some examples may be programmed to vary the amount of light output by light source 640 in response to information received from brightness sensor 630, in order to automatically provide a desirable level of brightness of the visual field, which helps maintain focus on materials and promotes conservation of sight health. Adjustment of visual field brightness is important in visual system health and for preventing fatigue resulting from reading text in inadequate lighting conditions.

As discussed above, processing unit 610 is attached to and programmed to receive and process information obtained by brain sensor 620. In some examples, brain sensor 620 may be implemented by a single channel EEG sensor. In some examples, brain sensor 620 may be implemented with multiple EEG sensors. Processing unit 620 is programmed to process EEG information received from brain sensor 620 to measure the quality of the user's concentration. Different frequencies of brain electrical activity are associated with actions and different levels of consciousness. Among EEG waves, beta2 and gamma together are linked with attention, perception, focused concentration, and cognition, whereas alpha1 waves are associated with disengagement and a generalized awareness of the surroundings with a lack of specific focus, and theta waves are linked to inefficiency and daydreaming. Thus, processing unit 610 is programmed to identify and record periods of dominance of gamma/beta2 waves as high concentration periods and dominance of alpha1/theta waves as low concentration periods. Processing unit 610 may be programmed to continuously or periodically determine a numeric level of concentration based on the detection of gamma/beta2 waves and alpha1/theta waves, and record and/or report the level of concentration as it changes over time. In some examples, processing unit 610 may be programmed to capture the user's visual field using camera 635 at times that processing unit 610 determines the level of concentration is below a threshold value, where the threshold may be a predetermined value or may be dynamically determined based on the user's concentration levels over time. In some embodiments, processing unit 610 may be programmed to alert the user in response to detecting a period with a low level of concentration, such as, for example, by turning on a red light or generating an audible signal. This can provide useful feedback to the user as to when and under what conditions effective concentration is being maintained to assist in time management and study planning. In some examples, first and second thresholds may be used by processing unit 610 to determine times the concentration level is above a first threshold and times the concentration level is below a second threshold.

In some examples, processing unit 610 may be programmed to receive proximity information from proximity sensor 625. Proximity sensor 625 may be implemented with, for example, a simple electromechanical switch configured to be triggered when the study aid device is worn, an infrared-based sensor, or a motion detector. Processing unit 610 may be programmed to determine that the device is in use or no longer in use in response to the received proximity information. In some examples, proximity sensor 625 may be omitted, and instead processing unit 610 may be programmed to utilize information received from brain sensor 620 to identify periods when the device is in use.

Processing unit 610 may be programmed to initiate various program routines and enable various features in response to having determined that the device is in use. For example, processing unit 610 may be programmed to record the times of day indicating the periods during which the device was in use. As another example, processing unit 610 may be programmed to activate, stop, resume, and/or reset a timer to measure an amount of time the device is or has been used. As another example, processing unit 610 may be programmed to turn on, turn off, and/or adjust the Output of light source 640, possibly in response to information received from brightness sensor 630. As another example, processing unit 610 may be programmed to initiate or terminate periodic collection and/or recording of information from brain sensor 620 and/or camera 635. As another example, processing unit 610 may be programmed to initiate or terminate periodic recording of a level of concentration determined by processing unit 610, as discussed above. As another example, processing unit 610 may be programmed to enable or disable transceiver 650 for data communication with external devices.

Processing unit 610 is also attached to and programmed to control and receive information from camera 635 attached to support 200. As discussed above, programming unit 610 may be programmed to use camera 635 to capture images during periods with low levels of concentration. After a study session, the user may refer to the captured images to identify material that may require additional review or might not have been captured by the user in their notes. In some examples, processing unit 610 may be programmed to provide a supervision mode, in which images are captured via camera 635 at regular or random intervals to allow a supervising individual to assure the user is studying appropriate content and that the study durations and schedule are appropriate.

Processing unit 610 is also attached to and programmed to send and receive data via transceiver 650 to exchange data with external device 660. Transceiver 650 may be configured to communicate via, for example, a wired or wireless data network connection. In some examples, external device 660 may be a computing device such as, but not limited to, a smartphone, a tablet computer, a notebook computer, a desktop computer, or a server computer. In some examples, processing unit 610 may be programmed to analyze information collected during the use of the device to generate usage summaries, reports, and/or graphs. In some examples, external device 660 may be configured to perform such analysis on data received from processing unit 610. In some embodiments, process unit 610 may be programmed to provide a web server or other server interface for providing access to collected information, pictures captured by camera 635, and/or analysis performed by processing unit 610. In order to improve one's study efficiency and their grade, a solid feedback is useful which this device intended to provide such parameters to the user and its supervisors. During study, important information, charts, algorithms and figures can be captured by person and be used for reviewing and further study.

In some examples, external device 660 may include an app or application specifically adapted for interacting with processing unit 610. That app or application may provide a user-friendly interface for reviewing information collected and generated by processing unit 610 about use of the study device. The app or application may also provide access to various configurable settings for processing unit 610, such as, but not limited to, a threshold concentration level, the brightness of light source 640, frequency of information logging, and/or enabling or disabling various features. In some examples, external device 660 may be programmed to send reports to a supervisor, such as a parent, via an email message 670 or an SMS or MMS message 680. In some examples, processing unit 610 may be programmed to initiate the sending of such reports, and either send them itself directly, or with the aid of external device 660.

In some examples, processing unit 610 may also be connected to and programmed to control a noise blocking device (not illustrated). In some examples, noise blocking device may be configured to provide active noise cancellation, perform playback of white noise or other noise to mask environmental noise, and/or play music. In some examples, a simple mechanical solution might be used for noise blocking, such as but not limited to ear plugs or ear muffs, may be used.

Although processing unit 610 may be configured to perform the various functions described above, processing unit 610 does not necessarily have to be configured to perform all of the above functions. For example, in some examples brightness sensor 630 and light source 640 may be omitted, and program code relating to these functions may likewise be omitted.

Figure 10:
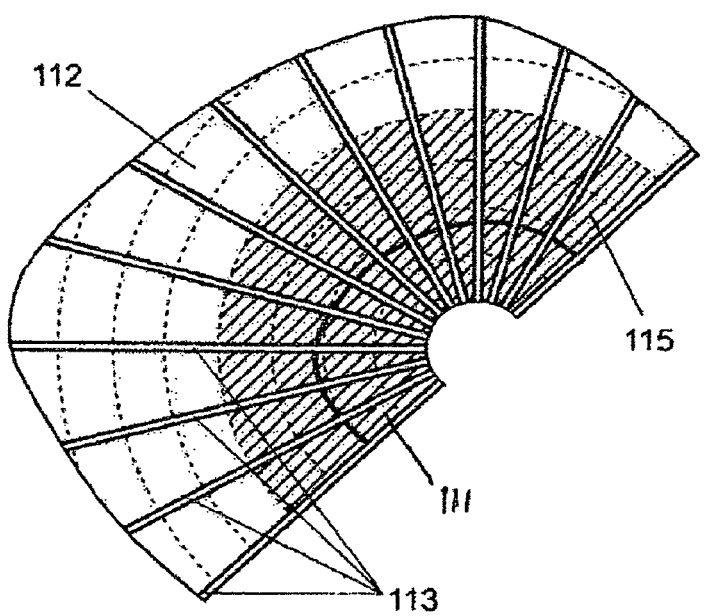
FIG. 10 illustrates an example in which visual shield 300 includes light-blocking elastic shield material 112 supported by hydraulic tubes 113 when the hydraulic tubes 113 are fully unrolled.
Figure 11:
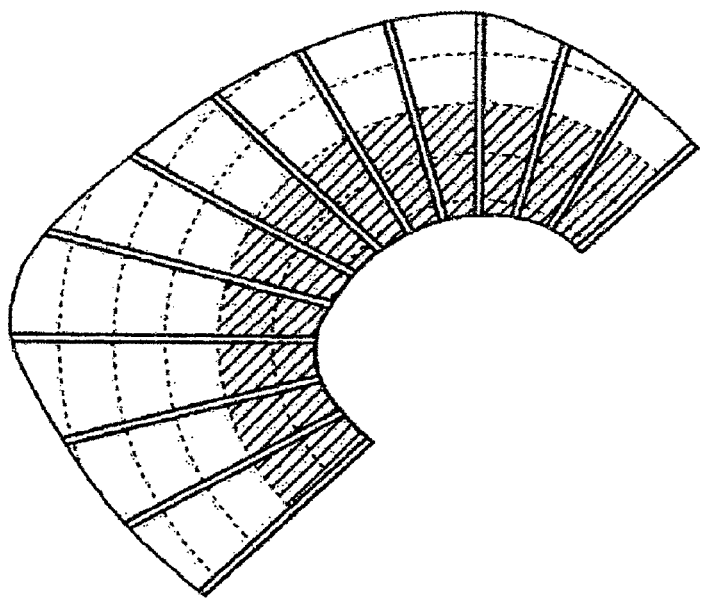
FIG. 11 illustrates an example of visual shield 300 in which the hydraulic tubes 113 are partially unrolled.
Figure 12:
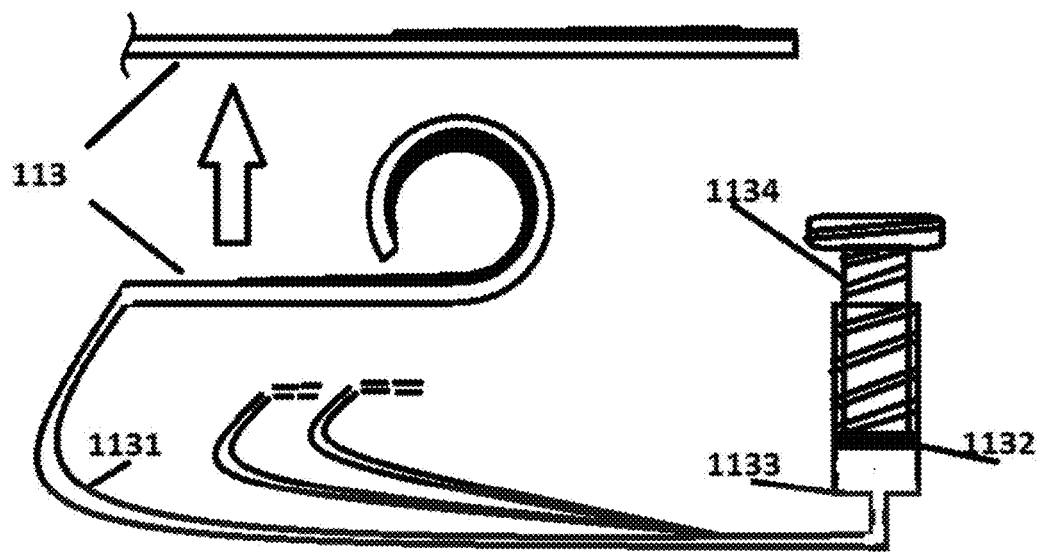
FIG. 12 illustrates an example of a hydraulic assembly for extending hydraulic tubes 113.

FIG. 10 illustrates an example in Which visual shield 300 includes light-blocking elastic shield material 112 supported by hydraulic tubes 113. In the specific example illustrated in FIG. 10, there are 13 hydraulic tubes 113 radially spaced apart from each other by approximately 15 degrees starting with a first hydraulic tube 113 at an angle of 45 degrees and ending with a thirteenth hydraulic tube 113 at an angle of 225 degrees. In other examples, there may be more or less hydraulic tubes 113. Operation of the hydraulic tubes is discussed in detail with respect to FIG. 12. In some examples, the shaded portion of FIG. 10 may include a light-blocking rigid shield material 115. In some examples, both the shaded and unshaded portions may include light-blocking elastic shield material 112. In some examples, the Unshaded portion of FIG. 10 may include a rigid shield material 112 for blocking minimum peripheral visual filed and become frame for other parts. The shaded portion may include an elastic material 115 due to prepare an adjustable peripheral visual field blocker. 115 showed to be adjustable with 20 degree amplitude from standard peripheral visual filed edge in FIG. 10. Although FIG. 10 illustrates an example in which hydraulic tubes 113 and the shield material therebetween extends within central visual field 111, in some examples hydraulic tubes 113 and the shield material therebetween do not obstruct central visual field 111 or obstruct it to a lesser degree than illustrated in FIG. 10. FIG. 11 illustrates an example of visual shield 300 in which the hydraulic tubes 113 are partially unrolled. The hydraulic tubes 113 may be configured to, for example, roll and unroll with approximately 20 degree amplitude from standard peripheral filed edge to regulate restriction of peripheral visual field by user FIG. 12 illustrates an example of a hydraulic assembly for extending hydraulic tubes 113. In the example illustrated in FIG. 12, hydraulic tube 113 is connected via connector tube 1131 to hydraulic pump 1132. In the particular example illustrated FIG. 12, hydraulic pressure may be applied by turning screw 1134 clockwise, which by mated threading on screw 1134 and outer cylinder 1133, causes screw 1134 to advance inward into outer cylinder 1133. Many other type of compact hydraulic pumps are known in the art. In some examples, an electrically actuated hydraulic pump under control of processing unit 610 may be used. FIG. 12 illustrates hydraulic tube 113 in two states: in the first state, illustrated at the top of FIG. 12, hydraulic pressure has been applied to hydraulic tube 113, causing it to radially extend by unrolling; in the second state, illustrated below the first state in FIG. 12, hydraulic pressure has been removed from hydraulic tube 113, which is configured to radially contract by rolling up upon itself when not pressurized. In some examples, the above action of hydraulic tube 113 may be reversed, where increased hydraulic pressure instead causes hydraulic tube 113 to contract. In some examples, hydraulic tube 113 may be configured to instead extend linearly, rather than by unrolling. In some examples, hydraulic tube 113 may be configured to have an arcuate or curved shape when extended, such that when fully extended visual shield takes a curved shape much as illustrated in FIGS. 5-8. In the example illustrated in FIG. 12, a single hydraulic pump 1132 is connected to, and causes the actuation of, multiple hydraulic tubes 113. In some examples, a single hydraulic pump 1132 actuates all of the hydraulic tubes 113 in visual shield 300. In some examples, the rolling of the hydraulic tubes 113 occurs inward toward the user's face. In some example, the rolling of the hydraulic tubes 113 occurs outward away from the user's face.

Figure 13:
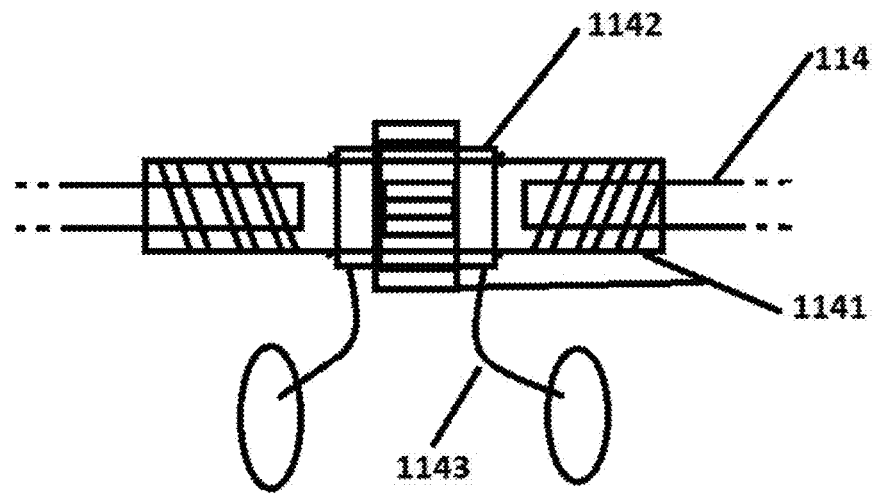
FIG. 13 illustrates an example of a width adjustor 1142 for accommodating variations in users' pupillary distances.

FIG. 13 illustrates an example of a width adjustor 1142 for accommodating variations in users' pupillary distances. In this particular example, width adjustor 1142 is combined with the support for nose pads 1143. By turning nut 1141, threads on the interior of nut 1141 engage with threads on supports 114 to either shorten or lengthen the portion of supports 114 outside of nut 1141. Each of supports 114 supports a respective half of visual shield 300, which in such examples is divided into two adjustable visual shields 301 and 302 (see FIG. 7) that can be moved apart or closer together by use of width adjustor 1142. In some examples, a radius for each of visual shields 301 and 302 is approximately 75 mm.

Figure 14:
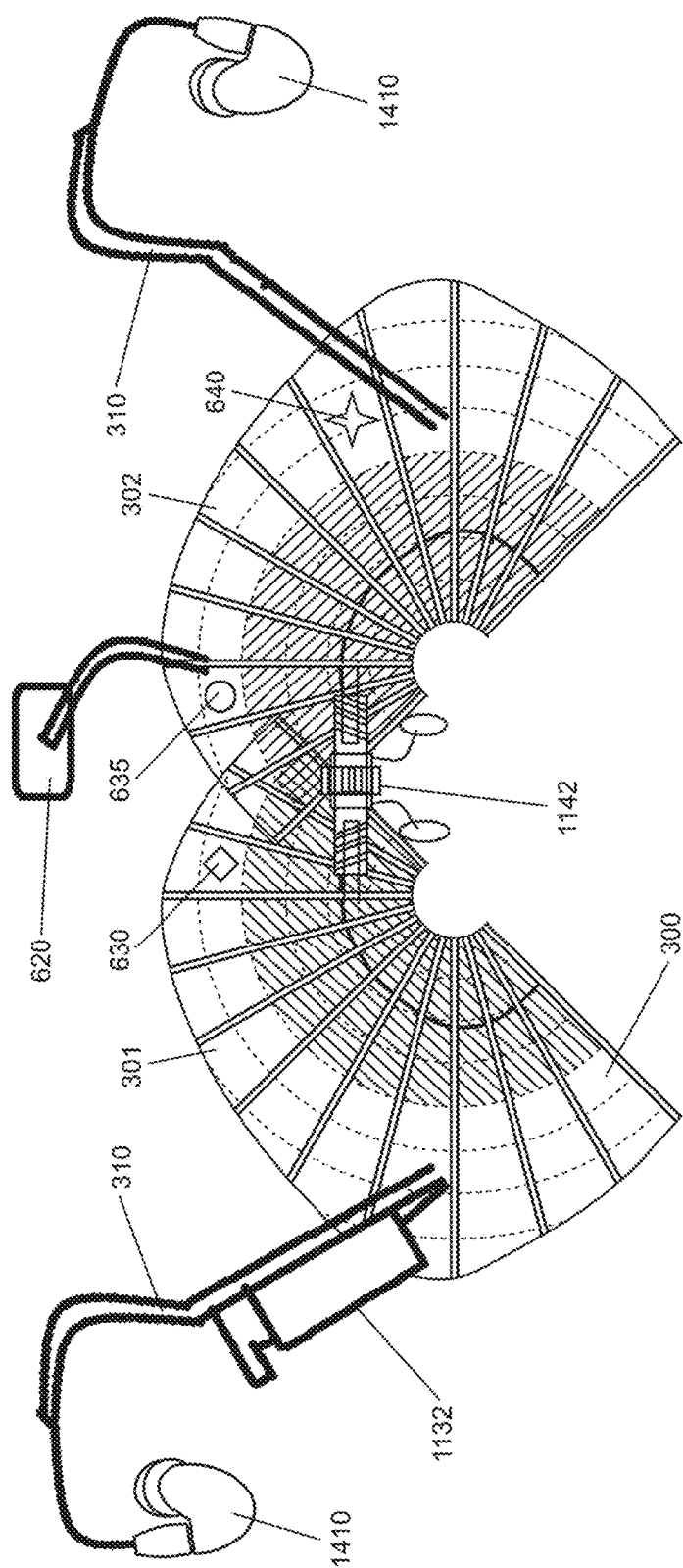
FIG. 14 is a schematic illustration of an assembly including visual shield 300, width adjustor 1142, hydraulic pump 1132, brain sensor 620, and temples 310.

FIG. 14 is a schematic illustration of an assembly including visual shield 300, width adjustor 1142, hydraulic pump 1132, brain sensor 620, and temples 310. Temples 310 allow the assembly to be worn like a pair of glasses, with the ends of temples 310 resting on the user's ears. In some examples, as illustrated in FIG. 14, hydraulic pump 1132 may be attached to a temple 310. Although an overlap of the two halves of visual shield 300, visual shields 301 and 302, is illustrated in FIG. 14, in some examples the overlap may be eliminated, and either left open or bridged with a flexible material that accommodates adjustments of width adjustor 1142. In examples also including transparent lenses 120, much as illustrated in FIG. 11, each of the two temples 310 may be coupled to a respective one of the lenses 120. In some examples instead of temples, clips were placed for mounting on regular eye glasses.

In some examples, visual shield 300 may be replaced with contact lenses (not illustrated) with a visual shield printed on or embedded in the contact lens. The assumed visual sphere radius would be approximately 17 mm. The techniques used for manufacturing self-orienting astigmatic contact lenses may also be adopted to ensure the contact lenses are appropriately oriented for functioning of the visual shield thereon. In such examples, various combinations of the other features described above, such as the components illustrated in FIG. 9, may be used in connection with the contact lenses.

In addition to direct effects from restricting a user's visual and auditory stimulation in order to conserve concentration, use of the devices described above can also have a psychological effect known as classical conditioning, whereby repeated use is associated with increased concentration on tasks such as studying, which may accelerate entering into a state of increased concentration. Additionally, use may also result in what is known as operant conditioning, in which people around a user are signaled to avoid distracting the user, as based on past experiences, such people learn that the user is unlikely to react to their actions while using the device, and such people understand that the user wishes to study without distraction.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and may be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, should may they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A device comprising:
a nose pad configured to be placed on a nose of a user; and
a first visual shield coupled to the nose pad and including a first plurality of hydraulic tubes radially spaced apart from each other and a light-blocking material therebetween, wherein the hydraulic tubes are configured to radially extend in response to hydraulic pressure to selectively restrict the user's peripheral visual field; and
a hydraulic pump connected to the plurality of hydraulic tubes, the hydraulic pump being coupled to the nose pad and configured to provide hydraulic pressure for radially extending the first plurality of hydraulic tubes.

2. The device of claim 1, further comprising:
a second visual shield coupled to the nose pad and including a second plurality of hydraulic tubes radially spaced apart from each other and a light-blocking material therebetween, wherein the hydraulic tubes are configured to radially extend in response to hydraulic pressure to selectively restrict a second portion of the user's peripheral visual field;
wherein the hydraulic pump is further configured to provide hydraulic pressure for radially extending the second plurality of hydraulic tubes.

3. The device of claim 2, further comprising two temples configured to be placed on the user's ears, wherein the first plurality of hydraulic tubes are radially spaced apart from each other by approximately a 15 degree distance.

4. The device of claim 2, wherein the first plurality of hydraulic tubes and the light-blocking material are arranged to restrict a visual area outside of a first central visual field of a first eye of the user.

5. The device of claim 4, wherein the first central visual field covers approximately 30 degrees from a pupil of the first eye.

6. The device of claim 4, wherein the first plurality of hydraulic tubes are configured to roll and unroll with approximately 20 degree amplitude from a standard peripheral filed edge to regulate restriction of peripheral visual field by user.

7. The device of claim 2, wherein the hydraulic pump includes a cylinder and a screw, wherein as the screw is tightened within the cylinder hydraulic pressure is built within the plurality of connectors to force the first plurality of hydraulic tubes to expand.

8. The device of claim 1, further comprising a brain sensor configured to sense a concentration level of the user.

9. The device of claim 8, further comprising a proximity sensor configured to determine proximity of the device to the user's head.

10. The device of claim 9, further comprising a processor configured to:
receive, from the proximity sensor, proximity information;
determine based on the received proximity information whether the device is being used; and
upon determining the device is being used, activate a timer to measure an amount of time the device is being used.

11. The device of claim 10, wherein the processor is further configured to:
determine the device is not being used subsequent to activation of the timer; and
in response to determining the device is not being used, deactivate the timer.

* * * * *